Nov. 10, 1959  D. A. JONES  2,911,766
INCREMENTAL LINEAR ACTUATOR
Filed Oct. 30, 1958  2 Sheets-Sheet 1

DERRICK A. JONES
INVENTOR,

BY
Homer L. Montague
ATT'Y.

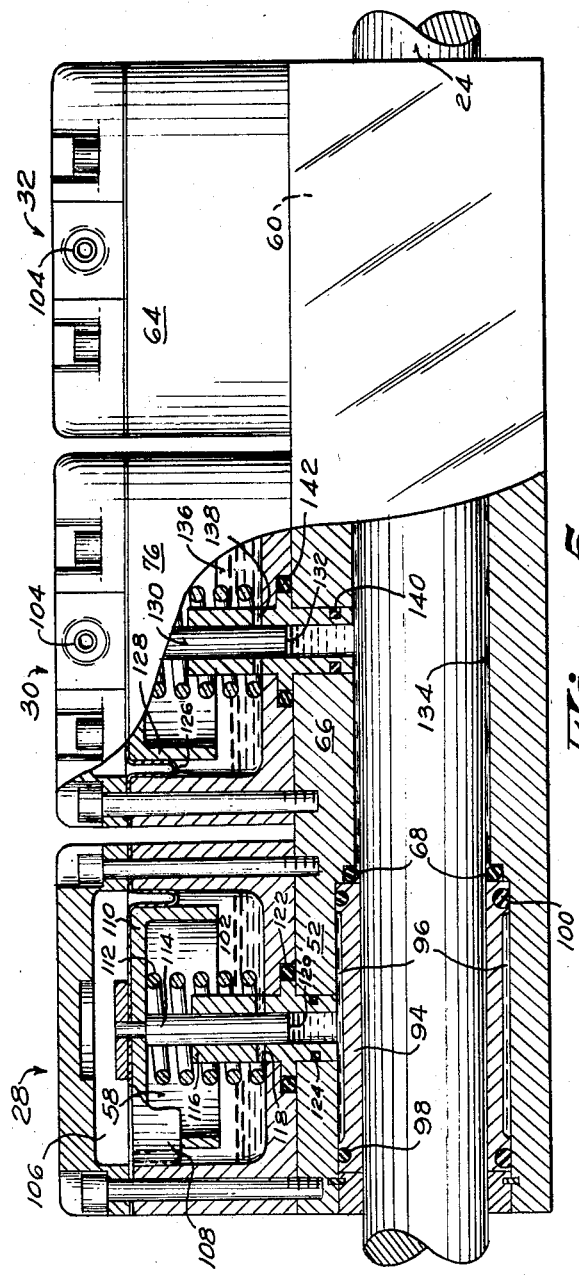

United States Patent Office 2,911,766
Patented Nov. 10, 1959

2,911,766
INCREMENTAL LINEAR ACTUATOR

Derrick A. Jones, Halesite, N.Y., assignor to Fairchild Camera and Instrument Corporation, a corporation of Delaware Application October 30, 1958, Serial No. 770,799

6 Claims. (Cl. 51—165)

This invention pertains generally to devices adapted to impart incremental linear movements to a movable element of an instrument or machine, such as a machine tool or the like, and more particularly to such devices wherein it is desired to impart such incremental movements in very small and accurately controlled steps.

In many of the mechanical arts there is a requirement to move one element relative to another in very small and very accurately controlled incremental steps. Exemplary of such arts is the machine tool field, wherein a movable bed or the like, which may support either the workpiece or the tool which is to perform some desired operation on such workpiece, is required to be advanced in either of two opposite directions in incremental steps as the workpiece is bored, ground or otherwise operated on by the bit, grinding wheel or the like of the particular machine tool on which the work is mounted. For the most part, such machine tools are required to operate under rather strict conditions, and in precision work the tolerances must be very close. In order to be able to produce a finished product within the close tolerances which have become commonplace today, it is obviously necessary to be able to control, to a very high degree, the positioning of the workpiece relative to the bit or other working element of the machine tool. This places some rather severe requirements on the mechanism which is to be employed to produce the relative movement between the movable bed of the machine tool and the base or other stationary portion thereof. Such mechanism must be both powerful enough to be able to drive the movable bed or the like in a positive manner and at the same time be capable of being controlled to a very fine degree as to the amplitude of the incremental movements imparted.

In the past it has been customary to provide a lead screw or the like as the sole drive element between the base of a machine tool and the movable bed thereof, the fineness of pitch of the screw thread determining in part the accuracy obtainable in achieving a precise relative positioning of the movable element with respect to the stationary. Even where a lead screw is manufactured with a sufficiently fine and accurate pitch in the thread thereof, usually at relatively great cost, to achieve precision operation in the utilization of the machine tool in which it is incorporated, the accuracy of such operation is always impaired by small unavoidable irregularities in the screw, and almost invariably as the machine is used for a period of time the screw thread becomes worn, usually unevenly, and most of the original precision is lost.

It is accordingly a primary object of the present invention to provide an actuating mechanism for effecting small incremental movements of one machine part or the like relative to another, wherein the continued use of such mechanism does not impair the accuracy of the operation thereof.

Another object of the invention is to provide an actuating mechanism for effecting small, accurately controllable incremental linear movements of one machine part or the like relative to another, wherein such relative movements are easily controlled and readily reproducible.

Still another object of the invention is to provide an actuating mechanism for effecting incremental movements of one machine part or the like relative to another, wherein the amplitude of such relative movement may be substantially smaller than that afforded by the devices of the prior art.

Yet another object of the invention is to provide an actuating mechanism for effecting small incremental movements of one machine part or the like relative to another, wherein such parts may be firmly held against relative motion except when such motion is desired.

In accordance with the present invention, the above and other objects are achieved by means of an elongate drive rod or the like having associated therewith a pair of gripping elements and a compression element. The compression and gripping elements are mounted on one of the machine parts between which the relative movement is to take place, and the drive rod is mounted on the other such machine part. A suitable control means connects the compression and gripping elements to a source of fluid pressure in a desired sequence, whereby one of the gripping elements is actuated to grip the drive rod, the compression element is then actuated to produce radial compression of the rod and resulting axial elongation thereof, whereafter the other gripping element is actuated to grip the rod and the first gripping element is then rendered inactive, with the compression element then being released to complete the cycle. As will be understood, the desired incremental motion may be achieved either during the axial elongation of the drive rod when under radial compression, or such motion may alternatively be derived from the contraction of the rod which occurs when the radial compression is released.

With the above considerations and objects in mind, the invention itself will now be described in connection with a preferred embodiment thereof given by way of example and not of limitation, and with reference to the accompanying drawings, in which:

Fig. 5 is an elevation view of a preferred form of the gripping and compression elements of the present invention, with parts being broken away for clarity of description.

Figure 1:
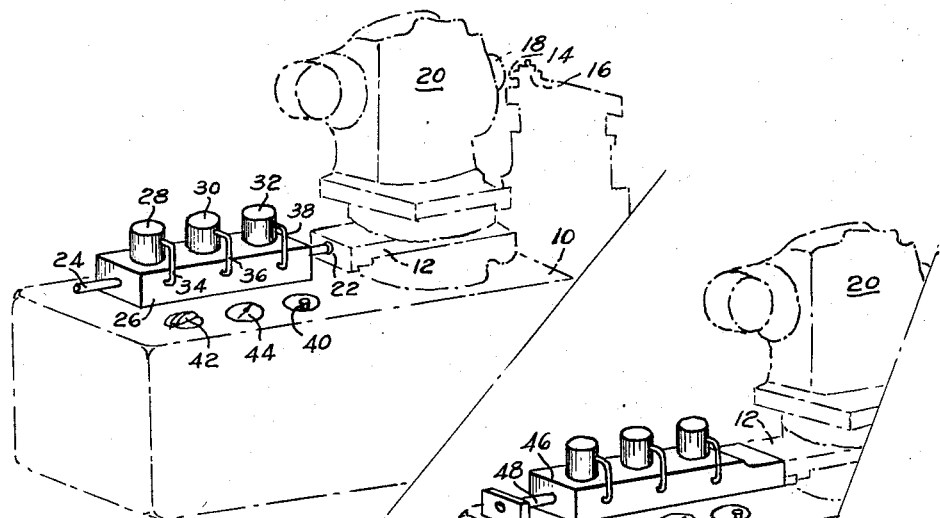
Fig. 1 is a perspective view, partially in phantom, of a machine tool incorporating a preferred form of the apparatus of the present invention.

Referring now to Fig. 1, a machine tool is shown in phantom lines, having a base member 10 and a relatively movable bed 12. A workpiece 14 is supported on a work holder 16 which is mounted on base 10, and a grinding wheel 18 is carried by movable bed 12, along with suitable means indicated generally at 20 for causing the necessary rotation of grinding wheel 18. As is known to those skilled in the art, means are usually provided between the movable bed 12 and equipment carried thereby to rotate such equipment on the bed so as to adjust the position of the grinding wheel 18 with respect to workpiece 14. Such rotary mounting means form no part of the present invention, and are therefore not shown. The present invention is concerned with the means for causing relative linear movement between grinding wheel 18 and the workpiece 14, such motion being accomplished by relative linear motion between bed 12 and base 10.

Attached securely to movable bed 12 by a suitable clamping flange or the like, as indicated at 22, is the drive rod or bar 24 of the apparatus of the present invention. As may be seen in the drawing, drive rod 24 extends through a housing 26 which generally defines the apparatus of this invention, which apparatus will be described in detail in connection with subsequent figures of the drawings. A general understanding of the invention may be gained, however, by a brief description of the apparatus as shown in one preferred form in Fig. 1. Situated on the upper side of housing 26 are a plurality of smaller housings 28, 30 and 32, each of which includes means which slidably receive rod 24 and which are supplied with a suitable fluid under a controlled pressure as by fluid conduits 34, 36 and 38. The fluid pressure in each of these conduits is controlled by means of a corresponding number of valves therein, each of which valves is adapted to be actuated by a common control cam (not shown in Fig. 1) connected to operating handle 40. The fluid supplied to unit 30 is further controlled by a pressure regulating means having a control handle 42 and a pressure indicating means 44. As will be further described hereinafter, suitable rotation of control handle 40 causes sequential operation of the devices in the three housings 28, 30 and 32, whereby rod 24 is controllably translated through the main housing 26 of the linear actuator of the present invention. As drive rod 24 is thus slidably moved in one axial direction or the other through housing 26, which latter housing is secured to the base 10 of the machine tool, the movable bed 12 is similarly displaced with respect to the workpiece 14.

Figure 2:
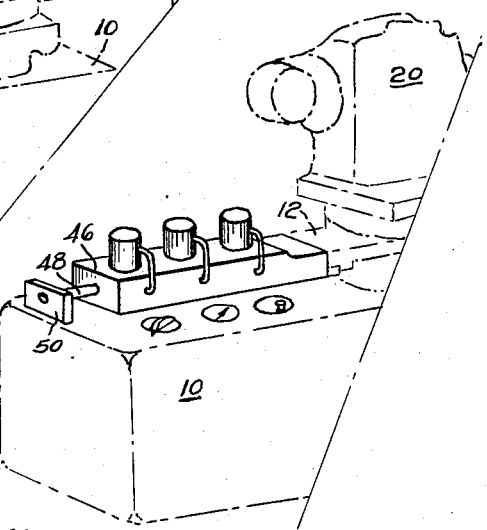
Fig. 2 is a partial perspective view similar to Fig. 1, illustrating a modified form of the apparatus of the present invention as applied to such a machine tool.

In an alternate form of the apparatus of the present invention, as shown in Fig. 2, the linear actuator housing 46 is securely attached to the movable bed 12 of the machine tool (instead of being secured to the base as in Fig. 1), and the rod 48 which is slidably received within housing 46 is here secured to base 10 as by the upstanding member 50 thereon. As is apparent, in the form shown in Fig. 2, the housing 46 walks along the stationary rod 48, while in the form of Fig. 1, the stationary housing 26 draws the movable rod 24 therethrough.

Figure 3:
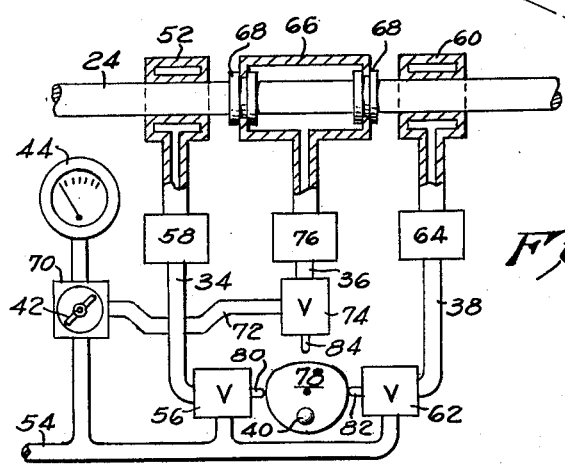
Fig. 3 is a schematic representation of the gripping and compression elements of the present invention, along with a preferred form of the control means therefor.

The apparatus contained within housing 26 (or, alternatively, within housing 46) and the control elements associated directly therewith are shown in schematic form in Fig. 3. As may be seen, drive rod 24 passes through a first annular gripping element 52, the inner cylindrical wall of which is in sliding engagement with rod 24. The interior of the hollow annular chamber 52 communicates with a suitable source of fluid pressure (not shown) through conduit 54, normally closed valve 56, conduit 34 and, as is often desirable, a pressure intensifier unit 58, the details of which intensifier unit are shown more clearly in Fig. 5. A second annular gripping element 60 also slidably receives rod 24 along its interior wall, gripping unit 60 being connected to the same source of fluid pressure via conduit 54, normally closed valve 62, conduit 38 and a second pressure intensifier unit 64. The inner cylindrical wall of each of the gripping elements is somewhat more flexible than the other walls thereof, so that when fluid pressure is introduced into the hollow interiors of each of these units, the inner cylindrical wall is flexed inwardly toward the rod 24 to effect a firm grip on the rod. Positioned on rod 24 at a point between the two gripping units 52 and 60 is a compression element 66 which is in the form of a hollow cylindrical chamber with rod 24 being slidably received in the opposite end walls thereof by means of suitable gaskets 68, which prevent the escape of the fluid introduced into the hollow interior of the unit. This interior of the compression unit 66 communicates with the aforementioned source of fluid pressure via conduit 54, a pressure regulator means 70, conduit 72, a normally-closed valve 74, conduit 36 and a third pressure intensifier unit 76. Pressure indicator 44 is associated with the pressure regulator 70 in order to indicate the pressure in conduit 72.

In order to actuate the three normally-closed valves 56, 62 and 74 in the desired sequence for achieving incremental relative motion between rod 24 and the three units 52, 60 and 66 (which three units are mounted on a common base or housing so as to prevent relative motion therebetween), the three valves are grouped around a common actuating means which takes the form of a cam 78 to which the handle 40 is attached. As may be seen in the drawing, cam member 78 has two main portions distinguished by the fact that the radius of one portion (which comprises somewhat more than one half of the periphery thereof) is substantially larger than the average radius of the other portion. The portion which has the larger radius is effective to actuate the operator members 80, 82 and 84 of the respective valves 56, 62 and 74 when such portion of larger radius is adjacent the valve operator. When the portion of cam member 78 which has the smaller average radius is adjacent a given valve operator, the cam periphery does not engage the operator and the valve remains in its normally-closed condition.

Figure 4:
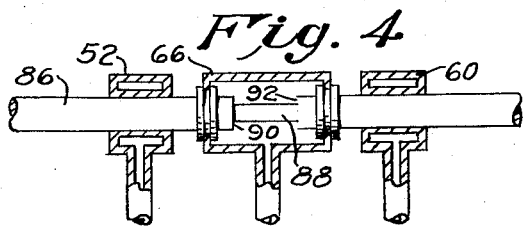
Fig. 4 is a schematic representation of the gripping and compression elements of the present invention shown with a modified form of drive rod.

An alternate form of the drive rod or other member which is slidably received by the gripping and compression members is shown in Fig. 4. In this form of the apparatus of the present invention, the drive rod 86 is modified by having a portion 88 thereof of reduced diameter in comparison to the diameter of the remaining portion of the rod. This portion 88 is placed within the compression chamber 66, and the limits of incremental motion between the rod 86 and the compression and gripping units are fixed by the relative length of the portion 88 and the axial length of compression means 66. In other words, the rod 86 must not be allowed to move relative to compression element 66 to such an extent that the portion 88 of reduced diameter extends out of either end of the compression unit. As will be appreciated by those skilled in the art, the form of the apparatus shown in Fig. 4 affords an advantage in providing a greater axial elongation of rod 86 per unit of pressure introduced into the interior of compression unit 66. This advantage arises out of the fact that the fluid pressure introduced into compression element 66 is effective not only in radially compressing rod 86 to bring about the aforementioned elongation thereof, but the portion 88 of reduced diameter leaves annular piston faces 90 and 92 on the respective mating or facing ends of the portions of the rod having the original or larger diameter. As the fluid pressure is increased within unit 66, rod 86 elongates due to both the radial compression within the unit 66 and the axial pressure on the piston faces 90 and 92.

A preferred form of the construction of the three units 28, 30 and 32 and the associated housing 26 is shown in Fig. 5, which shows the contents of housing 28 and a portion of those of unit 30 in vertical section. Gripping unit 52 is indicated generally within housing 28, with the inner cylindrical wall 94 of the unit slidably receiving rod 24 therein and being spaced from the remainder of the unit in order to provide a hollow chamber 96. A pair of annular gaskets 98 and 100 are provided at the extremities of the flexible inner wall 94 to prevent leakage of the pressurized fluid from the chamber 96. In the preferred form of the apparatus of the present invention, the fluid that is to be introduced into the chamber 96 is a liquid, the reserve supply of such liquid being held in the reservoir indicated generally at 102. Since it is sometimes convenient to use existing sources of air pressure at locations at which the apparatus described herein is to be used, as opposed to sources of liquid pressure, the units are designed to accept fluid pressure in the form of compressed air, which pressure is transformed to liquid pressure by the remaining elements in the respective housings 28, 30 and 32, portions of which elements will now be described.

Each of the housings 28, 30 and 32 is provided at a point near its top with a port 104 for introducing the air pressure of the respective conduits into the upper portion of the interior of the housing. Referring first to housing 28, it will be seen that the air passes into a chamber 106, the lower boundary of which is defined by a flexible diaphragm 108 which is supported by an air piston 110 and (at the periphery of the diaphragm) the side walls of the housing. Diaphragm 108 is provided with a loop as shown in order to permit a bellows action as piston 110 slides up and down within the housing 28, with the diaphragm serving to isolate the air chamber 106 from the liquid reservoir 102. A helical spring 112 acts to urge piston 110 upwardly against the force of gravity and against the smaller pressures which are introduced into the air chamber 106. The central shaft 114 of piston 110 rides in a sliding fit within a cylindrical member 116 which is vented at 118 to permit replenishing of the liquid (which may be any suitable non-corrosive liquid such as oil or the like) in chamber 96, from the supply in reservoir 102 when the shaft 114 is in its upward limit position. In this limit position, the lower end 120 of shaft 114 is slightly above the vents 118 to permit such replenishing. As will be understood, the lower end 120 of this shaft acts as the liquid piston and serves to transmit the force of the air pressure in the upper chamber to the liquid in chamber 96 to cause flexing of wall 94 in order to effect the desired gripping action. Additional annular or ring-like gaskets 122 and 124 are provided to ensure against loss of the fluid pressure in chamber 96.

The elements within housing 32 are identical with those described above in connection with housing 28, and therefore no detailed description of the contents of housing 32 will be given.

With reference now to the elements within housing 30, it will be observed that the upper portion of the unit is quite similar to such portion of unit 28. In particular, a flexible diaphragm 126 is supported upon an air piston 128 and by the side walls of the unit in a manner identical with that described above in connection with the flexible diaphragm 108. The central shaft 130 is secured to air diaphragm 126, and the lower end 132 thereof serves as the liquid piston for the compression unit. Liquid under this smaller piston 132 is directed to an annular space 134 which exists between the rod 24 and the inner cylindrical walls of the compression unit indicated generally at 66. A suitable gasket is provided between the rod 24 and the inner walls of unit 66 at each end of the unit, one of such gaskets being shown as an annular ring 68, first referred to in connection with Fig. 3. A liquid reservoir 136 is provided in order to hold reserve liquid for replenishing the liquid to be supplied to the annular compression space 134. As is the case in connection with reservoir 102, as the piston shaft 130 rises to its upward limit position, the lower end 132 thereof opens vents 138 to allow replenishing of the liquid in the chamber 134 when needed. Additional fluid-sealing gaskets 140 and 142 are provided to prevent the escape of fluid from the above-described chambers.

The operation of the apparatus of the present invention depends upon the principle of mechanics that states that when a prismatic bar or the like is subjected to transverse or radial compression, the axial length of the bar is increased by an increment which is proportional to the decrement in the transverse dimension. Irrespective of the length of the bar, the cross-section thereof, or the amplitude of the force applied (assuming that the applied force does not exceed the elastic limits of the particular material of the bar), the ratio of the decrement in transverse dimension to the increment in lengthwise dimension is always a constant of the material of the rod. This constant ratio is commonly referred to as Poisson's ratio. In the case of steel, the material contemplated for use in the drive rod 24 or 48 herein, the ratio is approximately three tenths.

Referring again to Fig. 3 for a general description of the operation of the apparatus of the present invention, with the cam member 78 in the position shown, valves 56 and 62 are both actuated, resulting in the application of the air pressure in conduit 54 to the pressure intensifiers 58 and 64, which latter units also serve to convert the air pressure into liquid pressure. The corresponding liquid pressure is then transmitted to the hollow interiors of the gripping means 52 and 60, and as a result the flexible inner walls thereof (one of which may be seen at 94 in Fig. 5) are pressed inwardly against the cylindrical surface of the rod 24 to effect a firm grip on the rod at both units. If cam member 78 is now rotated slightly in a clockwise direction, the first action that takes place is the closing of valve 62, since the portion of the cam member which is now adjacent the valve operator 82 is of an insufficient radius to hold the valve 62 open. The result of the closing of valve 62 is the release of the gripping action of gripping means 60.

As cam member 78 is turned further in a clock-wise direction, in particular through a little less than ninety degrees from the position shown in Fig. 3, the portion of the cam of larger radius comes under operator 84 of valve 74 to open such valve and apply the pressure of line 72 to the pressure intensifier unit 76. It will be understood that the pressure in conduit 72 is controlled by the setting of the pressure regulator 70, the particular setting determining the liquid pressure finally applied to the compression means 66 and, in turn, determining the amplitude of radial compression of rod 24 and the resulting lengthwise elongation of same. The dial of pressure indicator 44 may readily be calibrated in terms of this lengthwise incremental movement of the rod as a convenience in the operation of the apparatus.

With the predetermined pressure of line 72 thus applied to the pressure intensifier unit 76 (which unit will provide a fixed intensifying action so as not to disrupt the calibration of the dial of pressure indicator 44), a corresponding liquid pressure is applied to the compression element 66. As a result, rod 24 undergoes axial elongation toward the right (as seen in Fig. 3) from the reference point of the fixed clamp or gripping means 52. Whether it is the rod 24 that moves relative to some remote reference point or, on the other hand, the compression and gripping units which move relative to such point, depends upon whether the incremental advancing means of this invention is being utilized in accordance with the showing of Fig. 1 or Fig. 2 herein. In either case, all that need be shown in connection with a description of the apparatus forming the essential parts of the present invention is that the rod and the several annular units thereon move relative to each other (the three annular units moving as one).

Upon further clockwise rotation of cam member 78 by approximately an additional ninety degrees, the valve operator 82 is once again actuated by the larger portion of the cam member, resulting in the gripping of rod 24 at unit 60 again. In this position of the rotary cam, all three valves are held open, since the portion of the cam which has the sections of larger radii comprises somewhat more than half of the cam. Further clockwise rotation of cam 78 first closes valve 56 to release the grip of unit 52, and then closes valve 74 to release the compression exerted by unit 66. Upon such release of the pressure in unit 66, the rod 24 contracts and moves again toward the right (as seen in Fig. 3) toward the fixed or clamped portion within gripping means 60. When the cam 78 is further rotated to complete one cycle of the operation of the apparatus, it is once again in the position shown in Fig. 3, and the two gripping elements are both actuated, with the compression unit 66 de-energized. It will thus be seen that each successive cycle of the rotation of the control cam member 78 causes incremental movement between the rod 24, and the three units thereon, in the same direction in each cycle so long as the cam is rotated in but one direction. Obviously, rotation of the cam 78 in the direction opposite to that just described causes repeated incremental motion of the rod 24 to the left relative to the three units thereon.

Additional elongation of the drive rod may be realized by utilization of the modified rod shown in Fig. 4. As the liquid pressure is increased within the compression unit 66, the rod 86 is not only squeezed radially to create a corresponding elongation in accordance with Poisson's ratio, but additional elongation is achieved by reason of the axial or lengthwise force exerted on the rod by the liquid pressure against the annular piston faces 90 and 92. Care must be exercised to prevent an accumulation of relative motion between rod 86 and the compression unit 66 to the extent that the portion 88 of reduced diameter is withdrawn from within the compression unit; if desired, of course, stops may be placed on these members to limit the relative motion therebetween. Instead of utilizing this modified form of the drive rod to achieve greater thrust, it may be employed to afford the ordinarily expected linear increments of motion, where the source of air pressure is somewhat less than the normal range for which the apparatus is designed.

The operation of the particular structure of the apparatus as shown in Fig. 5 is readily apparent from what has been said above in connection with the operation of the general form of the devices as shown in Fig. 3. However, it might be pointed out here that the pressure intensification that is achieved by each of the three units 58, 76 and 64 is a result of the difference in the areas of the piston faces in each unit. For example, the air piston 110 of unit 58 may exhibit an area of, say, forty times the size of the liquid piston 120. Thus, a pressure of one hundred pounds per square inch on the upper surface of piston 110 results in a pressure of four thousand pounds per square inch at the smaller piston 120 which forces the liquid into chamber 94.

In further reference to the devices of the prior art in the general field of incremental relative movement between elements of a machine, instrument or the like, it should be noted that in addition to the lead screw devices referred to above there are several other presently known devices in the prior art whereby incremental relative motion between machine parts or the like may be achieved with one or more attendant advantages in comparison to the operation provided by the lead screw. One of the early steps taken to obtain improved performance over that provided by lead screw devices is the introduction of a magnetostrictive rod as the drive rod, with magnetic means associated therewith to encompass at least a portion of such magnetostrictive rod in a magnetic field of a desired strength at controlled times to effect elongation of same upon such magnetic energization, in accordance with the well known magnetostrictive effect wherein the magnetostrictive element undergoes an elongation when it is subjected to a magnetic field. By providing a pair of clamping means roughly analogous to the gripping means of the present invention, whereby respective points along the magnetostrictive rod are selectively clamped to another member, usually in a desired sequence, relative incremental motion may be achieved between the magnetostrictive rod and such other member which the clamping means grip.

In another form of means for achieving the desired relative incremental motion between machine parts or the like, the "drive rod" of the present invention is in the form of a pair of gripping or clamping members connected together by an expandible element which may be in the nature of a pneumatic or hydraulic bellows or the like. Upon the introduction of a suitable pressure within the bellows or other expandible element, the two clamping means undergo relative motion, usually a greater separation where the pressure in the bellows is increased, and selective sequential energization of the clamping means in association with a secondary member provides a relative motion between such member and the unit made up of the bellows and the two clamping means.

Still another modification of the "drive rod" of the prior art is exemplified by an incremental feed device having a drive rod with a pressure chamber or the like therein, along with a pair of gripping or clamping elements generally analogous to those of the present invention. A change in the fluid pressure that is supplied to the pressure chamber causes a change in the axial dimension of the drive rod, with the proper sequential operation of the clamping means affording the desired relative incremental motion between the drive rod and another member which is gripped by the clamping means.

It will be appreciated by those skilled in the art that the above modifications of the basic lead screw concept afford advantages thereover, but that such modifications do not approach the inventive concept of the present invention as disclosed and claimed herein. None of the prior art devices provides an incremental advance device wherein axial elongation of the drive rod is achieved in response to a transverse pressure thereon, whereby very small, accurately controlled and readily reproducible increments of motion may be achieved between parts of a machine or the like.

The invention has been described above in considerable detail, and particularly with reference to its application to the machine tool art wherein it is desired to achieve very small, accurately controlled linear increments of motion between the fixed base thereof and a movable bed or the like mounted thereon. However, it will be obvious to those skilled in the art that the invention is also applicable to other arts wherein it is desired to produce such small and accurately controlled increments of motion between two members. Of particular importance is the reproducibility of the precise increments of motion, both in the machine tool art and in other arts as well. One of the obvious applications other than that shown and described herein is the precision measuring art, wherein the dimensions of a given object must be determined to a very close tolerance.

In many of the applications to which the apparatus of the present invention may be put, including the machine tool bed as described herein, it will often be desirable to provide additional means for moving the drive rod through large increments of travel to effect a coarse feed. Once the relatively movable elements are positioned within a given range of the desired exact location, the coarse feed may be discontinued, and then the remainder of the positioning accomplished by the means described herein. For example, gross adjustments of the movable bed of the machine tool described herein may be achieved by means of the ordinary lead screw to position the bed as closely to the desired position as the fineness of the lead screw pitch will allow, then the linear actuator disclosed herein may be employed to effect the remaining final adjustment to the desired position relative to the base or other fixed portion of the tool.

In many instances, such a machine tool will be provided with a control system which includes means for measuring the dimension just produced in the workpiece by the preceding cut of the tool thereon, means for comparing this dimension with a standard or desired dimension for that particular portion of the workpiece, and means for applying the error signal, if any, comprising the output of the comparing means to the motive power means which control the lead screw or other drive means. By means of such a control system, the workpiece is continuously gauged and compared with the desired shape or size for the finished product. As errors appear in the control system, the drive means which are employed to effect relative movement between the movable bed of the machine tool and the base or other stationary portion thereof are called upon to supply a small additional movement corresponding to the error dimension.

Quite often, the error signal will represent an error dimension somewhat smaller than the smallest increment of motion producible by the drive means and the lead screw. That is to say, the error dimension may readily be less than the spacing between threads on the lead screw, and may even be less than the small linear increment of movement produced by the smallest rotational adjustment of the lead screw that may conveniently be measured. Further, the minuteness of the available small incremental step which may be produced by a lead screw is affected by the usually present thin film of lubrication on the working surface of the screw thread, such film being of variable and indeterminate thickness. Since the actuator disclosed herein is capable of providing incremental movements much smaller than those generally obtainable from a lead screw or the like, this actuator provides an excellent fine feed for use in connection with a lead screw coarse feed.

Further it will be appreciated that the three pressure intensifier units described herein need not necessarily be integral with the respective clamping or compression means, but may alternatively be grouped together at some other location, with liquid-carrying conduits connecting them to their respective gripping or compression means. Hence, the invention is not to be considered as limited to the particular details given, nor to the specific application to which reference has been made during the description of the apparatus, except insofar as may be required by the scope of the appended claims.

What is claimed is:

1. A device for imparting incremental translation to an elongate machine part or the like, comprising first and second clamp means operable to grip such machine part at different locations thereon, compression means positioned on such machine part at a location between said first and second clamp means and operable to compress such machine part in a direction transverse of the length thereof to effect lengthwise elongation of same, and control means connected to said first and second clamp means and to said compression means to operate such three means sequentially.

2. A device for imparting incremental translation to a machine part or the like, comprising an elongate drive rod connected to such machine part, first and second clamp means operable to grip said rod at different locations thereon, compression means positioned on said rod at a location between said first and second clamp means and operable to compress said rod in a direction transverse of the length thereof to effect lengthwise elongation of same, and control means connected to said first and second clamp means and to said compression means to operate such three means sequentially.

3. A device for imparting incremental translation to an elongate rod or the like, comprising first and second clamp means operable to grip such rod at different locations thereon and each including a hollow annular pressure chamber through which such rod passes, the mating surfaces of such rod and said chambers effecting a sliding fit, compression means positioned on such rod at a location between said first and second clamp means and operable to compress such rod in a direction transverse of the length thereof to effect lengthwise elongation of same, said compression means including a pressure chamber having fluid seals in opposing walls thereof, such rod passing through said fluid seals in sliding relationship therewith, a fluid-entry port in each of said chambers, and control means connected to said ports and operable to connect a source of fluid pressure to said ports sequentially.

4. A device for imparting incremental translation to an elongate rod or the like in accordance with claim 3, wherein a portion of the length of such rod that is within said compression means is of reduced dimension in a direction transverse of the length of such rod.

5. A device for imparting incremental translation to an elongate rod or the like in accordance with claim 3, including fluid-pressure multiplying means connected between said control means and each of said chambers.

6. A device for imparting incremental translation to a machine part or the like, comprising an elongate drive rod at least one point of which is stationary, first and second clamp means operable to grip said rod at different locations thereon, compression means positioned on said rod at a location between said first and second clamp means and operable to compress said rod in a direction transverse of the length thereof to effect lengthwise elongation of same, said clamp means being secured to such machine part, and control means connected to said first and second clamp means and to said compression means to operate such three means sequentially.

References Cited in the file of this patent

UNITED STATES PATENTS

| | | |
|---|---|---|
| 2,843,974 | Butterworth | July 22, 1958 |
| 2,843,975 | Kamm | July 22, 1958 |
| 2,843,976 | Silver | July 22, 1958 |